Figure 1:
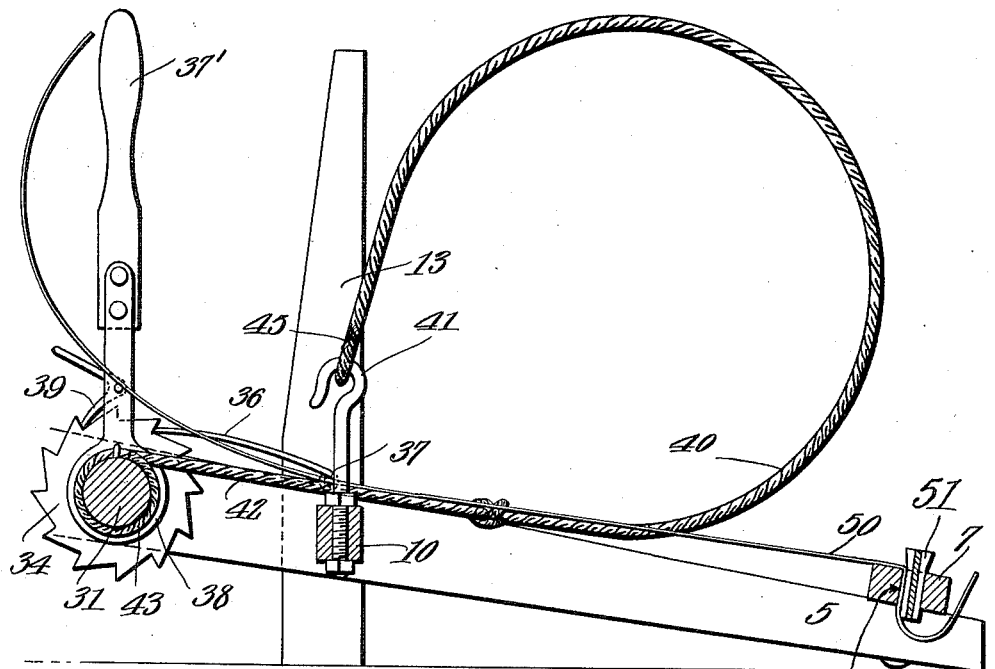

A. F. MEIERANT.
FODDER PRESS.
APPLICATION FILED MAR. 10, 1911.

1,005,994.

Patented Oct. 17, 1911.

Witnesses

August F. Meierant
Inventor,
by C. A. Snow & Co.
Attorneys.

UNITED STATES PATENT OFFICE.

AUGUST F. MEIERANT, OF LA GRANGE, MISSOURI.

FODDER-PRESS.

1,005,994.

Specification of Letters Patent. Patented Oct. 17, 1911.

Application filed March 10, 1911. Serial No. 613,483.

*To all whom it may concern:*

Be it known that I, AUGUST F. MEIERANT, a citizen of the United States, residing at La Grange, in the county of Lewis and State of Missouri, have invented a new and useful Fodder-Press, of which the following is a specification.

This invention relates to baling presses, and more especially to those of that type which have a flexible compressor for bundling; and the object of the same is to produce a portable press for bundling corn, fodder, and the like in shocks. This object is accomplished by the construction hereinafter more fully described and claimed, and as shown in the drawings wherein—

Figure 2:
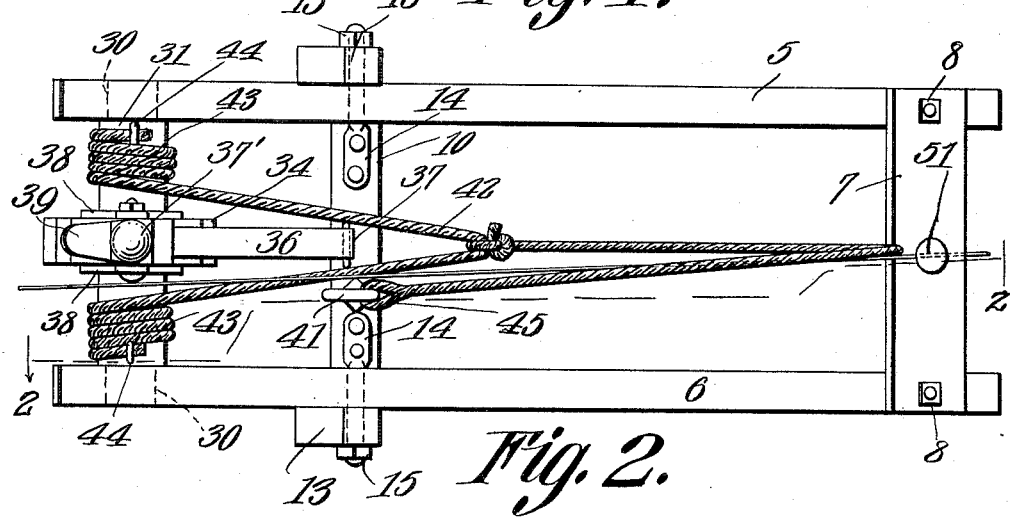

Figure 1 is a longitudinal section of the press taken on the line 2—2 of Fig. 2, and Fig. 2 is a plan of the press.

In the drawings, the main frame is composed of side bars 5 and 6 connected by cross bars 7 and 10, the former being bolted to the side bars as at 8 or in any equivalent manner, and the cross bar 10 being connected to the side bars by bolts 14 which extend through the side bars and through upright stakes 13, the bolts having nuts 15 on their outer extremities. Carried by the cross bar 10 at a point between the stakes 13 is a hook 41 to which a rope 40 or other flexible element is connected. This rope, after leading around the shock or bundle in a manner to be described below, is branched as at 42, and each branch is coiled as at 43 around a windlass 31 and fastened thereto as at 44. This windlass 31 is journaled in bearings 30 in the side bars 5 and 6, and has secured to its center a ratchet 34 which is engaged by the tip of a pawl 36 that is pivoted at its inner end at the point 37 to the cross bar 10. Mounted loosely on the windlass at each side of said ratchet is an eye 38 at one extremity of a fork which carries the operating lever 37', and pivoted within said fork is a pawl 39 whose tip also engages the ratchet 34.

It will be obvious that by loosening the nuts 15 the stakes 13 can be turned down into parallelism with the side bars 5 and 6, so that the entire machine can be stored in small space.

The wire, designated by the numeral 50, is attached by any suitable device to the cross bar 7, as by a plug 51 registering on a hole 52 in said bar, the wire being led thence between the hook 41 and the lever 37 as seen in Fig. 2. The rope 40 is then unwound from the windlass and laid alongside the wire lengthwise of the main frame, and the corn or fodder to be bundled is laid across said frame and against the stakes 13. When a sufficient amount of fodder has been accumulated, the outer free end of the rope is brought around over the bundle as indicated in Fig. 1 and its eye 45 engaged with the hook 41, and then the lever 37 is reciprocated to cause the windlass to draw in on the branches 42 of the rope and compress the loop of the latter around the bundle until the bundle is reduced to proper size. The wire 50 is then led around the bundle near or alongside the rope 40, and the ends of the wire are twisted together or formed into a knot in any suitable manner. The pawl 36 is then disengaged from the ratchet 34, the rope 40 allowed to slacken up, the eye 45 at its free end disengaged from the hook 41 and laid out for renewed use, and the tied-up bundle removed; after which the operation may be repeated as above described.

What is claimed is:

The herein described fodder press comprising a rectangular framework whereof one end cross bar has a wire-receiving hole, a plug for holding the wire therein, a windlass journaled across the other end of the framework and having a ratchet, an operating lever having a pawl engaging said ratchet, a retaining pawl pivoted to another cross bar of the framework and engaging said ratchet, upright stakes at opposite ends of the last named cross bar, bolts secured to the latter and passing through the side bars of the framework and through said stakes and receiving nuts, a hook rising from the last named cross bar, and a flexible element having an eye in its extremity adapted to engage said hook, the other end of the flexible element being branched and coiled around the ends of said windlass and secured thereto.

In testimony that I claim the foregoing as my own, I have hereto affixed my signature in the presence of two witnesses.

AUGUST F. MEIERANT.

Witnesses:
BAMA E. CLAY,
WM. V. ACCOLA.

---

Copies of this patent may be obtained for five cents each, by addressing the "Commissioner of Patents, Washington, D. C."